(12) United States Patent
Hu

(10) Patent No.: US 11,584,865 B2
(45) Date of Patent: Feb. 21, 2023

(54) INK, INK MANUFACTURING METHOD, AND DISPLAY DEVICE

(71) Applicant: Shenzhen China Star Optoelectronics Semiconductor Display Technology Co., Ltd., Shenzhen (CN)

(72) Inventor: Zhiping Hu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 552 days.

(21) Appl. No.: 16/627,781

(22) PCT Filed: Dec. 16, 2019

(86) PCT No.: PCT/CN2019/125618
§ 371 (c)(1),
(2) Date: Dec. 31, 2019

(87) PCT Pub. No.: WO2021/109226
PCT Pub. Date: Jun. 10, 2021

(65) Prior Publication Data
US 2021/0355335 A1    Nov. 18, 2021

(30) Foreign Application Priority Data
Dec. 3, 2019 (CN) .......................... 201911221333.6

(51) Int. Cl.
*C09D 11/38* (2014.01)
*C09D 11/322* (2014.01)
(Continued)

(52) U.S. Cl.
CPC ............ *C09D 11/38* (2013.01); *C09D 11/322* (2013.01); *C09D 11/36* (2013.01); *C09D 11/54* (2013.01)

(58) Field of Classification Search
CPC ....... C09D 11/36; C09D 11/101; C09D 11/50; C09D 11/54; C09D 11/322; C09D 11/38;
(Continued)

(56) References Cited

U.S. PATENT DOCUMENTS 7,749,300 B2 * 7/2010 Chretien ................... B22F 1/17
                                              977/777
10,326,058 B2 * 6/2019 Luchinger ................ F21K 9/64
(Continued)

FOREIGN PATENT DOCUMENTS

CN    107325642    11/2017
CN    107500345    12/2017
(Continued)

OTHER PUBLICATIONS

Protesescu et al. "Nanocrystals of Cesium Lead Halide Perovskites (CsPbX3, X = Cl, Br, and I): Novel Optoelectronic Materials Showing Bright Emission with Wide Color Gamut", Nano Letter, 15(6): 3692-3696, Jan. 29, 2015.

*Primary Examiner* — An H Do
(74) *Attorney, Agent, or Firm* — PV IP PC; Wei Te Chung; Ude Lu

(57) ABSTRACT

The present disclosure provides an ink, an ink manufacturing method, and a display device. The ink includes the first solution, the second solution, the third solution, the fourth solution, and the blank ink. The ink is mixed from the fourth solution and the blank solution. The mass percentage of the $CsPbX_3$ in the fourth solution is 5% to 30% to the fourth solution and the blank ink.

7 Claims, 2 Drawing Sheets

(51) Int. Cl.
   *C09D 11/36* (2014.01)
   *C09D 11/54* (2014.01)
(58) Field of Classification Search
   CPC .............. C09K 11/0833; C09K 11/665; C01G 21/006; C01P 2002/34; C01P 2006/80
   See application file for complete search history.

(56) References Cited

U.S. PATENT DOCUMENTS

| | | | |
|---|---|---|---|
| 10,749,065 B2 * | 8/2020 | Wang | ...................... H01L 31/18 |
| 2018/0105743 A1 | 4/2018 | Dou et al. | |

FOREIGN PATENT DOCUMENTS

| | | |
|---|---|---|
| CN | 107849446 | 3/2018 |
| CN | 108502918 | 9/2018 |
| CN | 109370312 | 2/2019 |
| CN | 109504379 | 3/2019 |
| CN | 109796812 | 5/2019 |
| CN | 110014766 | 7/2019 |
| CN | 110093065 | 8/2019 |
| CN | 110137166 | 8/2019 |
| CN | 110275351 | 9/2019 |
| CN | 110511326 | 11/2019 |
| CN | 109280422 | 9/2021 |
| KR | 10-2019-0055396 | 5/2019 |

* cited by examiner

US 11,584,865 B2

INK, INK MANUFACTURING METHOD, AND DISPLAY DEVICE

RELATED APPLICATIONS

This application is a National Phase of PCT Patent Application No. PCT/CN2019/125618 having International filing date of Dec. 16, 2019, which claims the benefit of priority of Chinese Patent Application No. 201911221333.6 filed on Dec. 3, 2019. The contents of the above applications are all incorporated by reference as if fully set forth herein in their entirety.

FIELD AND BACKGROUND OF THE INVENTION

The present disclosure relates to the field of display technologies, particularly to an ink, an ink manufacturing method, and a display device.

With the rapid development of display technologies, various types of display technologies have emerged. Among them, quantum dots have great development potential due to their excellent optical characteristics. All-inorganic perovskite quantum dots have better stability and are more suitable for display light-emitting components.

Inkjet printing technology is an effective method to implement full-color quantum dots. In the prior art, there is a lack of all inorganic perovskite quantum dot inks that can be used for full-color inkjet printing technology.

Therefore, an ink, an ink manufacturing method, and a display device are urgently required to solve the above technical problems.

Technical Problems

The present disclosure provides an ink, an ink manufacturing method, and a display device to solve the technical problem of lacking a method of inkjet printing for all inorganic perovskite quantum dots which can be applied to full-color inkjet printing technology.

SUMMARY OF THE INVENTION

To solve the problems above, the present disclosure provides the following technical solutions.

An ink, comprising:

A first solution composed of a caesium carbonate, a first oleic acid, and an organic non-coordinating solvent.

A second solution composed of a lead halide $PbX_2$, an organic non-coordinating solvent, an oleylamine, and a second oleic acid, wherein the X is a halogen.

A third solution comprises a $CsPbX_3$, wherein the third solution is mixed from the first solution and the second solution.

A fourth solution centrifuged and purified from the third solution.

A blank ink composed of a photoinitiator, a prepolymer, and a monomer.

The fourth solution is mixed with the blank ink to form the ink, a mass percentage of the $CsPbX_3$ in the fourth solution is 5% to 30% to the fourth solution and the blank ink.

In the ink of the present disclosure, the X of the $CsPbX_3$ is selected from one or more than one of a chlorine, a bromine, and an iodine.

In the ink of the present disclosure, the X is composed of the chlorine and the bromine, and mole ratio of $PbCl_2$ to $PbBr_2$ is 1:1.

In the ink of the present disclosure, the X is composed of the iodine and the bromine, and mole ratio of $PbI_2$ to $PbBr_2$ is 1:1.

In the ink of the present disclosure, a mass percentage the $CsPbX_3$ of the fourth solution is 20% to the fourth solution and the blank ink.

In the ink of the present disclosure, the photoinitiator comprises 1-hydroxy ketone or benzophenone, the prepolymer comprises acrylic light curable resin, and the monomer comprises acrylic acid or methacrylate.

In the ink of the present disclosure, a mass percentage of the photoinitiator is 1% to 5% to the ink, a mass percentage of the prepolymer is 40% to 60% to the ink, and a mass percentage of the monomer is 10% to 20% to the ink.

An ink manufacturing method, comprising:

Preparing a first solution by mixing a caesium carbonate, a first oleic acid, and an organic non-coordinating solvent;

Preparing a second solution by mixing a lead halide $PbX_2$, an organic non-coordinating solvent, an oleylamine, and a second oleic acid, wherein the X is a halogen;

Preparing a third solution comprising a $CsPbX_3$ by mixing the first solution and the second solution;

Preparing a fourth solution by centrifuging and purifying the third solution;

Preparing a blank ink by mixing a photoinitiator, a prepolymer, and a monomer

The fourth solution is mixed with the blank ink to form the ink, a mass percentage of the $CsPbX_3$ in the fourth solution is 5% to 30% to the fourth solution and the blank ink.

In the ink manufacturing method of the present disclosure, the X of the $CsPbX_3$ is selected from one or more than one of a chlorine, a bromine, and an iodine.

In the ink manufacturing method of the present disclosure, the X is composed of the chlorine and the bromine, and mole ratio of $PbCl_2$ to $PbBr_2$ is 1:1.

In the ink manufacturing method of the present disclosure, the X is composed of the iodine and the bromine, and mole ratio of $PbI_2$ to $PbBr_2$ is 1:1.

In the ink manufacturing method of the present disclosure, preparing the first solution comprises:

Obtaining a first mixing solution composed of the caesium carbonate, the first oleic acid, and the organic non-coordinating solvent.

Heating the first mixing solution to 100° C. to 150° C. in a noble gas.

Obtaining the first solution when the first mixing solution is clear.

A concentration of the caesium carbonate in the first mixing solution is 0.1 mol/L to 0.3 mol/L, and a mass percentage of the first oleic acid to the first solution is 5% to 10%.

In the ink manufacturing method of the present disclosure, preparing the second solution comprises:

Obtaining a second mixing solution composed of the lead halide $PbX_2$ and the organic non-coordinating solvent caesium carbonate, the first oleic acid, and the organic non-coordinating solvent.

Heating the second mixing solution to 150° C. to 200° C. in a noble gas and mixing for 1 to 1.5 hours to obtain a third mixing solution.

Heating the third mixing solution to 150° C. to 200° C. and mixing the third mixing solution with the oleylamine and the second oleic acid.

Obtaining the second solution when the third mixing solution is clear.

A concentration of the lead halide in the second mixing solution is 0.15 mol/L to 0.2 mol/L, a mass percentage of the second oleic acid to the second solution is 5% to 10%, and a mass percentage of the oleylamine to the second solution is 5% to 10%.

In the ink manufacturing method of the present disclosure, preparing the third solution comprises:

Mixing the first solution and the second solution for 15 to 20 seconds in a noble gas and cooling in a cold water for 5 to 10 minutes for obtaining the third solution.

In the ink manufacturing method of the present disclosure, a mass percentage the CsPbX3 in the fourth solution is 20% to the fourth solution and the blank ink.

In the ink manufacturing method of the present disclosure, the photoinitiator comprises 1-hydroxy ketone or benzophenone, the prepolymer comprises acrylic light curable resin, and the monomer comprises acrylic acid or methacrylate.

In the ink manufacturing method of the present disclosure, a mass percentage of the photoinitiator is 1% to 5% to the ink, a mass percentage of the prepolymer is 40% to 60% to the ink, and a mass percentage of the monomer is 10% to 20% to the ink.

A display device, wherein a luminous layer of the display device is formed by an ink through ultraviolet curing, and the ink comprises:

A first solution composed of a caesium carbonate, a first oleic acid, and an organic non-coordinating solvent.

A second solution composed of a lead halide PbX2, an organic non-coordinating solvent, an oleylamine, and a second oleic acid, wherein the X is a halogen.

A third solution comprising a CsPbX3, wherein the third solution is mixed from the first solution and the second solution.

A fourth solution centrifuged and purified from the third solution.

A blank ink composed of a photoinitiator, a prepolymer, and a monomer.

The fourth solution is mixed with the blank ink to form the ink, a mass percentage of the CsPbX3 in the fourth solution is 5% to 30% to the fourth solution and the blank ink.

In the display device of the present disclosure, the X of the CsPbX3 is selected from one or more than one of a chlorine, a bromine, and an iodine.

In the display device of the present disclosure, the X is composed of the iodine and the bromine, and mole ratio of PbI2 to PbBr2 is 1:1.

Beneficial Effects

An all inorganic perovskite quantum dots ink applied to full-color inkjet printing technology is manufacturing according to the present disclosure which mixes the blank ink and the quantum dots solutions by adding different halogens when preparing the lead halide solution. Thus the full-color inkjet printing is implemented.

DESCRIPTION OF SPECIFIC EMBODIMENTS OF THE INVENTION

The present disclosure provides an ink, an ink manufacturing method, and a display device. In order to clarify the object, technical solutions, and effects of the present disclosure, embodiments accompanying with drawings are provided to describe the present disclosure in detail. Obviously, the mentioned embodiments are utilized to clarify the present disclosure instead of limiting the present disclosure.

Figure 2:
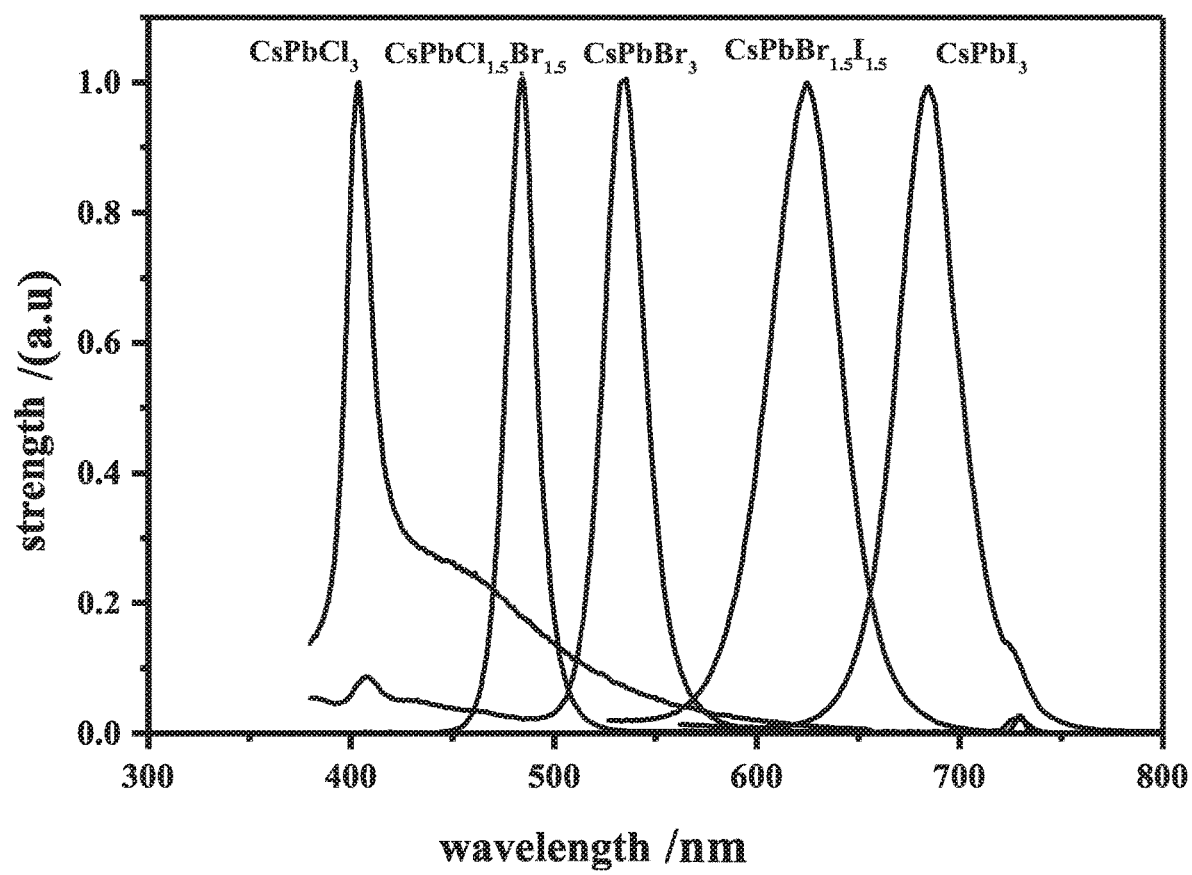
FIG. 2 illustrates an emission spectrum of an ink manufactured by the manufacturing method of the present disclosure.

Please refer to FIG. 2. The present disclosure provides an ink includes:

A first solution is composed of a caesium carbonate, a first oleic acid, and an organic non-coordinating solvent.

A second solution is composed of a lead halide PbX2, an organic non-coordinating solvent, an oleylamine, and a second oleic acid, wherein the X is a halogen.

A third solution includes a CsPbX3. The third solution is mixed from the first solution and the second solution.

A fourth solution is centrifuged and purified from the third solution.

A blank ink is composed of a photoinitiator, a prepolymer, and a monomer.

The fourth solution is mixed with the blank ink to form the ink, a mass percentage of the CsPbX3 in the fourth solution is 5% to 30% to the fourth solution and the blank ink.

An all inorganic perovskite quantum dots ink applied to full-color inkjet printing technology is manufacturing according to the present disclosure which mixes the blank ink and the quantum dots solutions by adding different halogens when preparing the lead halide solution. Thus the full-color inkjet printing is implemented.

The technical solutions of the present disclosure are illustrated accompanying with specific embodiments.

A First Embodiment.

Please refer to FIG. 2. The ink includes the first solution, the second solution, the third solution, the fourth solution, and the blank ink.

The first solution is composed of a caesium carbonate, a first oleic acid, and an organic non-coordinating solvent.

The second solution is composed of a lead halide PbX2, an organic non-coordinating solvent, an oleylamine, and a second oleic acid, wherein the X is a halogen.

The third solution includes a CsPbX3. The third solution is mixed from the first solution and the second solution.

A fourth solution is centrifuged and purified from the third solution.

A blank ink is composed of a photoinitiator, a prepolymer, and a monomer.

The fourth solution is mixed with the blank ink to form the ink, a mass percentage of the CsPbX3 in the fourth solution is 5% to 30% to the fourth solution and the blank ink.

In this embodiment, the first oleic acid is oleic acid.

In this embodiment, the first solution is cesium oleate solution.

In this embodiment, the noble gas includes nitrogen and helium.

In this embodiment, the organic non-coordinating solvent includes octadecene.

In this embodiment, the second oleic acid is oleic acid.

In this embodiment, the second solution is lead halide precursor solution.

In this embodiment, the X of the CsPbX3 is selected from one or more than one of a chlorine, a bromine, and an iodine.

In this embodiment, X is composed of the chlorine and the bromine and a mole ratio of PbCl2 to PbBr2 is 1:1

In this embodiment, X is composed of the iodine and the bromine, and a mole ratio of PbI2 to PbBr2 is 1:1.

In this embodiment, X is chlorine. The third solution includes CsPbCl3 and the ink includes CsPbCl3. Please refer to FIG. 2, CsPbCl3 has an emission wavelength of 380 nm to 410 nm and a half-peak width of 17 nm.

In this embodiment, X is iodine. The third solution includes CsPbI3 and the ink includes CsPbI3. Please refer to FIG. 2, CsPbI3 has an emission wavelength of 680 nm to 700 nm and a half-peak width of 35 nm.

In this embodiment, X is composed of the chlorine and the bromine, and a mole ratio of PbCl2 to PbBr2 is 1:1. The third solution includes CsPb(Br/Cl)3 and the ink includes CsPb(Br/Cl)3. Please refer to FIG. 2, in the present technologies, the emission wavelength of quantum dots is changed by changing the particle size of the quantum dots. The particle size of the quantum dots is not easy to be controlled. However, by changing the adding ratio of halogens, the emission wavelength of the emission spectrum of the obtained CsPbCl1.5Br1.5 is shorter than CsPbBr3. The emission wavelength of CsPbBr3 is 520 nm to 535 nm and the half-peak width of CsPbBr3 is 21 nm. The emission wavelength of CsPbCl1.5Br1.5 is 520 nm to 535 nm and the half-peak width of CsPbCl1.5Br1.5 is 21 nm which supplements the emission wavelength vacancy between 450 nm to 550 nm.

In this embodiment, X is composed of the iodine and the bromine, and mole ratio of PbI2 to PbBr2 is 1:1. The third solution includes CsPb(Br/I)3 and the ink includes CsPb(Br/I)3. Please refer to FIG. 2, in the present technologies, the emission wavelength of quantum dots is changed by changing the particle size of the quantum dots. The particle size of the quantum dots is not easy to be controlled and the emission wavelength obtained by changing he particle size of the quantum dots is 600 nm to 640 nm. However, by changing the adding ratio of halogens, the emission wavelength of the emission spectrum of the obtained CsPbBr1.5I1.5 is shorter than CsPbBr3. The emission wavelength of CsPbBr3 is 520 nm to 535 nm and the half-peak width of CsPbBr3 is 21 nm. The emission wavelength of CsPbBr1.5I1.5 is 610 nm to 630 nm and the half-peak width of CsPbBr1.5I1.5 is 21 nm which supplements the emission wavelength vacancy between 600 nm to 640 nm.

In this embodiment, the photoinitiator includes 1-hydroxy ketone or benzophenone. The prepolymer includes acrylic light curable resin, and the monomer includes acrylic acid or methacrylate.

In this embodiment, the acrylic light curable resin can includes epoxy acrylate, polyacrylate, and polyurethane acrylate.

In this embodiment, a mass percentage of the photoinitiator is 1% to 5% to the ink, a mass percentage of the prepolymer is 40% to 60% to the ink, and a mass percentage of the monomer is 10% to 20% to the ink.

In this embodiment, preparing the blank ink includes mixing scattering particles, initiators, prepolymers, and monomers to prepare the blank ink.

In this embodiment, a mass percentage of the scattering particles to the ink is less than or equal to 10%.

In this embodiment, a mass percentage of the CsPbX3 in the fourth solution is 5% to 30% to the fourth solution and the blank ink.

In this embodiment, the ink viscosity is less than 20 centipoise,

In this embodiment, blue ray illuminates through the ink manufactured by the ink manufacturing method to implement full color emission wavelength.

In this embodiment, the X can be selected from one or more than one of a chlorine, a bromine, and an iodine. Different wavelength between 400 nm to 700 nm can be implemented by adjusting the ratio of the halogens, as shown in FIG. 2, which will not be listed in detail here.

An all inorganic perovskite quantum dots ink applied to full-color inkjet printing technology is manufacturing according to the present disclosure which mixes the blank ink and the quantum dots solutions by adding different halogens when preparing the lead halide solution. Thus the full-color inkjet printing is implemented.

Figure 1:
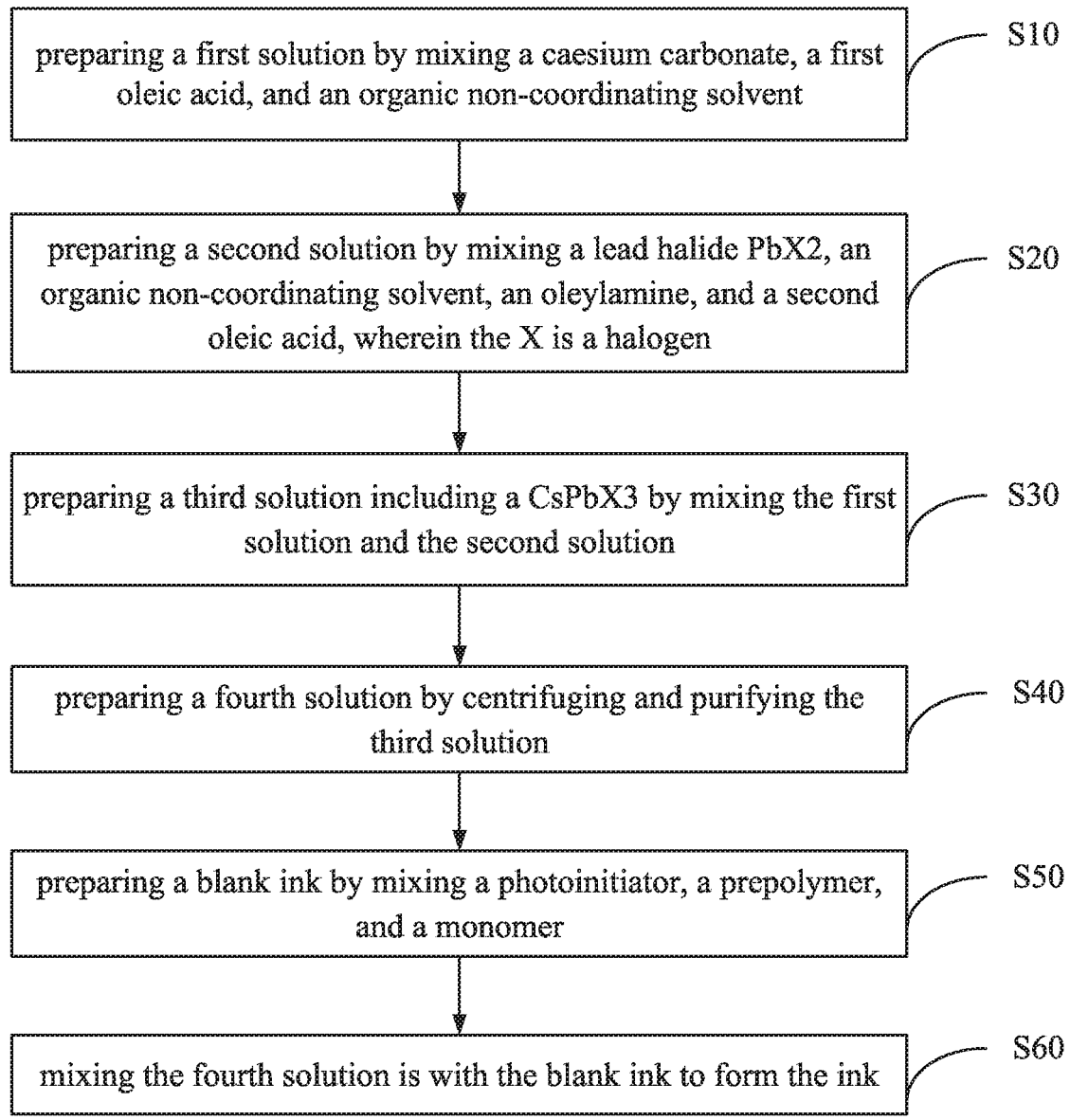
FIG. 1 illustrates manufacturing processes of an ink manufacturing method of the present disclosure.

Please refer to FIG. 1 and FIG. 2. The present disclosure provides an ink manufacturing method includes:

S10: preparing a first solution by mixing a caesium carbonate, a first oleic acid, and an organic non-coordinating solvent.

S20: preparing a second solution by mixing a lead halide PbX2, an organic non-coordinating solvent, an oleylamine, and a second oleic acid, wherein the X is a halogen.

S30: preparing a third solution including a CsPbX3 by mixing the first solution and the second solution.

S40: preparing a fourth solution by centrifuging and purifying the third solution.

S50: preparing a blank ink by mixing a photoinitiator, a prepolymer, and a monomer.

S60: mixing the fourth solution is with the blank ink to form the ink. A mass percentage of the CsPbX3 in the fourth solution is 5% to 30% to the fourth solution and the blank ink.

An all inorganic perovskite quantum dots ink applied to full-color inkjet printing technology is manufacturing according to the present disclosure which mixes the blank ink and the quantum dots solutions by adding different halogens when preparing the lead halide solution. Thus the full-color inkjet printing is implemented.

The technical solutions of the present disclosure are illustrated accompanying with specific embodiments.

A second embodiment.

S10: preparing a first solution by mixing a caesium carbonate, a first oleic acid, and an organic non-coordinating solvent.

In this embodiment, preparing a first solution includes:

S11: obtaining a first mixing solution composed of the caesium carbonate, the first oleic acid, and the organic non-coordinating solvent, and heating the first mixing solution to 100° C. to 150° C. in a noble gas.

S12: obtaining the first solution when the first mixing solution is clear.

A concentration of the caesium carbonate in the first mixing solution is 0.1 mol/L to 0.3 mol/L, and a mass percentage of the first oleic acid to the first solution is 5% to 10%.

In this embodiment, the first oleic acid is oleic acid.

In this embodiment, the first solution is cesium oleate solution.

In this embodiment, the noble gas includes nitrogen and helium.

In this embodiment, the organic non-coordinating solvent includes octadecene.

S20: preparing the second solution by mixing the lead halide PbX2, the organic non-coordinating solvent, the oleylamine, and the second oleic acid. The X is a halogen.

In this embodiment, the X of the CsPbX3 is selected from one or more than one of a chlorine, a bromine, and an iodine.

In this embodiment, X is composed of the chlorine and the bromine and a mole ratio of PbCl2 to PbBr2 is 1:1

In this embodiment, X is composed of the iodine and the bromine, and a mole ratio of PbI2 to PbBr2 is 1:1.

In this embodiment, preparing the second solution includes:

S21: obtaining a second mixing solution composed of the lead halide PbX2 and the organic non-coordinating solvent caesium carbonate, the first oleic acid, and the organic non-coordinating solvent.

S22: heating the second mixing solution to 150° C. to 200° C. in a noble gas and mixing for 1 to 1.5 hours to obtain a third mixing solution.

S23: heating the third mixing solution to 150° C. to 200° C., mixing the third mixing solution with the oleylamine and the second oleic acid, and obtaining the second solution when the third mixing solution is clear;

A concentration of the lead halide in the second mixing solution is 0.15 mol/L to 0.2 mol/L, a mass percentage of the second oleic acid to the second solution is 5% to 10%, and a mass percentage of the oleylamine to the second solution is 5% to 10%.

In this embodiment, the second oleic acid is oleic acid.

In this embodiment, the second solution is lead halide precursor solution.

In this embodiment, the noble gas includes nitrogen and helium.

In this embodiment, the organic non-coordinating solvent includes octadecene.

S30: preparing the third solution including a CsPbX3 by mixing the first solution and the second solution.

In this embodiment, preparing the third solution including: mixing the first solution and the second solution for 15 to 20 seconds in a noble gas and cooling in a cold water for 5 to 10 minutes for obtaining the third solution.

In this embodiment, X is chlorine. The third solution includes CsPbCl3 and the ink includes CsPbCl3. Please refer to FIG. 2, CsPbCl3 has an emission wavelength of 380 nm to 410 nm and a half-peak width of 17 nm.

In this embodiment, X is iodine. The third solution includes CsPbI3 and the ink includes CsPbI3. Please refer to FIG. 2, CsPbI3 has an emission wavelength of 680 nm to 700 nm and a half-peak width of 35 nm.

In this embodiment, X is composed of the chlorine and the bromine, and a mole ratio of PbCl2 to PbBr2 is 1:1. The third solution includes CsPb(Br/Cl)3 and the ink includes CsPb(Br/Cl)3. Please refer to FIG. 2, in the present technologies, the emission wavelength of quantum dots is changed by changing the particle size of the quantum dots. The particle size of the quantum dots is not easy to be controlled. However, by changing the adding ratio of halogens, the emission wavelength of the emission spectrum of the obtained CsPbCl1.5Br1.5 is shorter than CsPbBr3. The emission wavelength of CsPbBr3 is 520 nm to 535 nm and the half-peak width of CsPbBr3 is 21 nm. The emission wavelength of CsPbCl1.5Br1.5 is 520 nm to 535 nm and the half-peak width of CsPbCl1.5Br1.5 is 21 nm which supplements the emission wavelength vacancy between 450 nm to 550 nm.

In this embodiment, X is composed of the iodine and the bromine, and mole ratio of PbI2 to PbBr2 is 1:1. The third solution includes CsPb(Br/I)3 and the ink includes CsPb(Br/I)3. Please refer to FIG. 2, in the present technologies, the emission wavelength of quantum dots is changed by changing the particle size of the quantum dots. The particle size of the quantum dots is not easy to be controlled and the emission wavelength obtained by changing the particle size of the quantum dots is 600 nm to 640 nm. However, by changing the adding ratio of halogens, the emission wavelength of the emission spectrum of the obtained CsPbBr1.5I1.5 is shorter than CsPbBr3. The emission wavelength of CsPbBr3 is 520 nm to 535 nm and the half-peak width of CsPbBr3 is 21 nm. The emission wavelength of CsPbBr1.5I1.5 is 610 nm to 630 nm and the half-peak width of CsPbBr1.5I1.5 is 21 nm which supplements the emission wavelength vacancy between 600 nm to 640 nm.

In this embodiment, the noble gas includes nitrogen and helium.

S40: preparing the fourth solution by centrifuging and purifying the third solution.

In this embodiment, preparing the fourth solution includes:

S41: mixing an organic solvent with the third solution and then solution are centrifuging for 5 to 15 minutes. The centrifugation rotating speed is 5000 to 9000 revolutions per minute.

S42: removing a supernatant clean solution, adding the organic solvent, and then centrifuging for 5 minutes to 15 minutes after sonication. The centrifugation rotating speed is 5000 to 9000 revolutions per minute.

In this embodiment, the organic solvent can be yoluene, n-hexane, or octane.

S43: repeating S42 three to five times to prepare the fourth solution.

S50: preparing a blank ink by mixing a photoinitiator, a prepolymer, and a monomer.

In this embodiment, the photoinitiator includes 1-hydroxy ketone or benzophenone. The prepolymer includes acrylic light curable resin, and the monomer includes acrylic acid or methacrylate.

In this embodiment, the acrylic light curable resin can includes epoxy acrylate, polyacrylate, and polyurethane acrylate.

In this embodiment, the mass percentage of the photoinitiator is 1% to 5% to the ink, the mass percentage of the prepolymer is 40% to 60% to the ink, and the mass percentage of the monomer is 10% to 20% to the ink.

In this embodiment, preparing the blank ink includes mixing scattering particles, initiators, prepolymers, and monomers to prepare the blank ink.

In this embodiment, a mass percentage of the scattering particles to the ink is less than or equal to 10%.

In this embodiment, the blank ink is prepared in temperature between 15° C. to 30° C.

S60: mixing the fourth solution is with the blank ink to form the ink. The mass percentage of the CsPbX3 in the fourth solution is 5% to 30% to the fourth solution and the blank ink.

In this embodiment, the mass percentage the CsPbX3 of the fourth solution is 20% to the fourth solution and the blank ink.

In this embodiment, the ink viscosity is less than 20 centipoise,

In this embodiment, blue ray illuminates through the ink manufactured by the ink manufacturing method to implement full color emission wavelength.

In this embodiment, the X can be selected from one or more than one of a chlorine, a bromine, and an iodine. Different wavelength between 400 nm to 700 nm can be implemented by adjusting the ratio of the halogens, as shown in FIG. 2, which will not be listed in detail here.

In this embodiment, the ink manufacturing method includes: adding 100 mg of caesium carbonate powder, 4 ml of octadecene, and 600 μl of oleic acid to a first flask and heated to 120° C. for one hour with nitrogen and magnetic stirring until the caesium carbonate was completely dissolved into a cesium oleate solution for reserve. Add 5 ml of octadecene and 0.18 mol of PbBr2 to a second flask, place the second flask on a heating mantle, stir with nitrogen, magnetically and heat to 120° C. Increase the temperature to 150° C. after heating for one hour, add 0.5 ml oleylamine and 0.5 ml oleic acid then heat for 3 to 5 minutes until the solution is transparent and PbBr2 is completely dissolved. Pipette 0.4 ml of cesium oleate solution into the second flask and react for 15 seconds. The flask was quickly removed and the reaction was stopped with cold water bath to prepare CsPbBr3 quantum dot solution. Centrifuge the CsPbBr3 quantum dot solution at a speed of 9000 rpm, remove the supernatant clean solution after 5 minutes of centrifugation, retain the bottom solution, add octane to the bottom solution and centrifuge again after sonicate to fully dissolve. Centrifugation speed is 9,000 rpm. After centrifugation for 5 minutes, repeating to remove the supernatant clean solution, retain the bottom solution, add octane to the bottom solution, and centrifuge the mixture for three times. The purified CsPbBr3 quantum dots were dissolved in an octane solvent and reserve for use. Polyacrylate having 70% of blank ink mass percentage is used as prepolymer. 1-hydroxy ketone having 15% of blank ink mass percentage is used as photoinitiator, and methacrylate having 15% of blank ink mass percentage is used as monomer. Photoinitiator, monomer, and prepolymer were stirred and mixed at room temperature to prepare blank ink. The CsPbBr3 quantum dot solution and the blank ink were stirred and mixed uniformly. The CsPbBr3 quantum dots have 20% of the mass percentage of the CsPbBr3 quantum dot solution and the blank ink. The mole ratio of PbCl2 to PbBr2 is 1:1 to prepare a CsPb(Br/Cl)3 quantum dot solution. For details, please refer to FIG. 2, the emission wavelength of the emission spectrum of the obtained CsPbCl1.5Br1.5 is shorter than CsPbBr3. The emission wavelength of CsPbBr3 is 520 nm to 535 nm and the half-peak width of CsPbBr3 is 21 nm. The emission wavelength of CsPbCl1.5Br1.5 is 520 nm to 535 nm and the half-peak width of CsPbCl1.5Br1.5 is 21 nm which supplements the emission wavelength vacancy between 450 nm to 550 nm.

In this embodiment, the ink manufacturing method includes: adding 100 mg of caesium carbonate powder, 4 ml of octadecene, and 600 μl of oleic acid to a first flask and heated to 120° C. for one hour with nitrogen and magnetic stirring until the caesium carbonate was completely dissolved into a cesium oleate solution for reserve. Add 5 ml of octadecene, 0.18 mol of PbBr2, and 0.1 mol of PbI2 to a second flask, place the second flask on a heating mantle, stir with nitrogen, magnetically and heat to 120° C. Increase the temperature to 170° C. after heating for one hour, add 0.5 ml oleylamine and 0.5 ml oleic acid then heat for 3 to 5 minutes until the solution is transparent and PbBr2 and PbI2 are completely dissolved. Pipette 0.4 ml of cesium oleate solution into the second flask and react for 15 seconds. The flask was quickly removed and the reaction was stopped with cold water bath to prepare CsPb(Br/I)3 quantum dot solution. Centrifuge the CsPb(Br/I)3 quantum dot solution at a speed of 9000 rpm, remove the supernatant clean solution after 5 minutes of centrifugation, retain the bottom solution, add octane to the bottom solution and centrifuge again after sonicate to fully dissolve. Centrifugation speed is 9,000 rpm. After centrifugation for 5 minutes, repeating to remove the supernatant clean solution, retain the bottom solution, add octane to the bottom solution, and centrifuge the mixture for three times. The purified CsPb(Br/I)3 quantum dots were dissolved in an octane solvent and reserve for use. Polyacrylate having 70% of blank ink mass percentage is used as prepolymer. 1-hydroxy ketone having 15% of blank ink mass percentage is used as photoinitiator, and methacrylate having 15% of blank ink mass percentage is used as monomer. Photoinitiator, monomer, and prepolymer were stirred and mixed at room temperature to prepare blank ink. The CsPb(Br/I)3 quantum dot solution and the blank ink were stirred and mixed uniformly. The CsPb(Br/I)3 quantum dots have 20% of the mass percentage of the CsPb(Br/I)3 quantum dot solution and the blank ink. The mole ratio of PbI2 to PbBr2 is 1:1 to prepare CsPb(Br/I)3 quantum dot solution. For details, please refer to FIG. 2, the emission wavelength of the emission spectrum of the obtained CsPbBr1.5I1.5 is shorter than CsPbBr3. The emission wavelength of CsPbBr3 is 520 nm to 535 nm and the half-peak width of CsPbBr3 is 21 nm. The emission wavelength of CsPbBr1.5I1.5 is 610 nm to 630 nm and the half-peak width of CsPbBr1.5I1.5 is 21 nm which supplements the emission wavelength vacancy between 600 nm to 640 nm.

An all inorganic perovskite quantum dots ink applied to full-color inkjet printing technology is manufacturing according to the second embodiment which mixes the blank ink and the quantum dots solutions by adding different halogens when preparing the lead halide solution. Thus the full-color inkjet printing is implemented.

Figure 3:
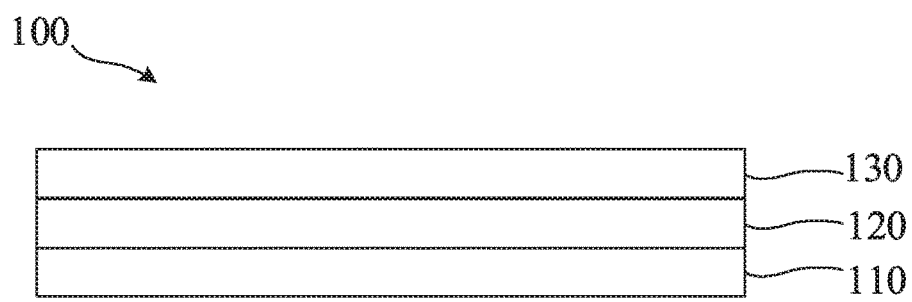
FIG. 3 illustrates a structural diagram of a display device of the present disclosure.

Please refer to FIG. 3 the present disclosure provides a display device 100 which has a luminous layer 120 formed by the ink mentioned above through ultraviolet curing.

An all inorganic perovskite quantum dots ink applied to full-color inkjet printing technology is manufacturing according to the present disclosure which mixes the blank ink and the quantum dots solutions by adding different halogens when preparing the lead halide solution. Thus the full-color inkjet printing is implemented.

In this embodiment, as shown in FIG. 3, the display device 100 includes an array substrate 110, the luminous layer 120 disposed on the array substrate 110, and a cover glass on the luminous layer 120.

In this embodiment, the luminous layer 120 of the display device 100 is formed by the ink of the first embodiment through ultraviolet curing.

In this embodiment, the luminous layer 120 is formed on the array substrate 110 by inkjet printing and ultraviolet curing.

In this embodiment, the ink includes CsPbCl1.5I1.5.

In this embodiment, the ink viscosity is less than 20 centipoise.

In this embodiment, the display device has the luminous layer formed by the ink through ultraviolet curing so that full-color display of the display device is achieved.

To conclude, the present disclosure provides an ink, an ink manufacturing method, and a display device. The ink includes the first solution, the second solution, the third solution, the fourth solution, and the blank ink. The ink is mixed from the fourth solution and the blank solution. The mass percentage of the CsPbX3 in the fourth solution is 5% to 30% to the fourth solution and the blank ink. An all inorganic perovskite quantum dots ink applied to full-color inkjet printing technology is manufacturing according to the present disclosure which mixes the blank ink and the quantum dots solutions by adding different halogens when preparing the lead halide solution. Thus the full-color inkjet printing is implemented.

Obviously, any equivalent substitutions or modifications can be obtained by a skilled person in the art according to aspects of the present disclosure fall in the protected scope of the present disclosure.

What is claimed is:

1. An ink manufacturing method, comprising:
   preparing a first solution by mixing a caesium carbonate, a first oleic acid, and an organic non-coordinating solvent;
   preparing a second solution by mixing a lead halide $PbX_2$, an organic non-coordinating solvent, an oleylamine, and a second oleic acid, wherein the X is a halogen;
   preparing a third solution comprising a $CsPbX_3$ by mixing the first solution and the second solution;
   preparing a fourth solution by centrifuging and purifying the third solution;
   preparing a blank ink by mixing a photoinitiator, a prepolymer, and a monomer
   wherein the fourth solution is mixed with the blank ink to form the ink, a mass percentage of the $CsPbX_3$ in the fourth solution is 5% to 30% to the fourth solution and the blank ink;
   wherein preparing the third solution comprises: mixing the first solution and the second solution for 15 to 20 seconds in a noble gas and cooling in a cold water for 5 to 10 minutes for obtaining the third solution.

2. The ink manufacturing method according to claim 1, wherein the X of the $CsPbX_3$ is selected from one or more than one of a chlorine, a bromine, and an iodine.

3. The ink manufacturing method according to claim 2, wherein the X is composed of the chlorine and the bromine, and mole ratio of $PbCl_2$ to $PbBr_2$ is 1:1.

4. The ink manufacturing method according to claim 2, wherein the X is composed of the iodine and the bromine, and mole ratio of $PbI_2$ to $PbBr_2$ is 1:1.

5. The ink manufacturing method according to claim 1, wherein a mass percentage the $CsPbX_3$ in the fourth solution is 20% to the fourth solution and the blank ink.

6. The ink manufacturing method according to claim 1, wherein the photoinitiator comprises 1-hydroxy ketone or benzophenone, the prepolymer comprises acrylic light curable resin, and the monomer comprises acrylic acid or methacrylate.

7. The ink manufacturing method according to claim 1, wherein a mass percentage of the photoinitiator is 1% to 5% to the ink, a mass percentage of the prepolymer is 40% to 60% to the ink, and a mass percentage of the monomer is 10% to 20% to the ink.

* * * * *